(12) United States Patent
Ishizaki et al.

(10) Patent No.: US 11,042,530 B2
(45) Date of Patent: Jun. 22, 2021

(54) DATA PROCESSING WITH NULLABLE SCHEMA INFORMATION

(71) Applicant: INTERNATIONAL BUSINESS MACHINES CORPORATION, Armonk, NY (US)

(72) Inventors: Kazuaki Ishizaki, Tokyo (JP); Takanori Ueda, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 243 days.

(21) Appl. No.: 15/873,030

(22) Filed: Jan. 17, 2018

(65) Prior Publication Data
US 2019/0220532 A1   Jul. 18, 2019

(51) Int. Cl.
| G06F 7/00 | (2006.01) |
| G06F 17/00 | (2019.01) |
| G06F 16/23 | (2019.01) |
| G06F 16/21 | (2019.01) |
| G06F 16/22 | (2019.01) |
| G06F 16/2453 | (2019.01) |

(52) U.S. Cl.
CPC ........ *G06F 16/2365* (2019.01); *G06F 16/213* (2019.01); *G06F 16/221* (2019.01); *G06F 16/2453* (2019.01); *G06F 16/24535* (2019.01)

(58) Field of Classification Search
None
See application file for complete search history.

(56) References Cited

U.S. PATENT DOCUMENTS

| 6,560,774 | B1 * | 5/2003 | Gordon | G06F 9/44589 |
| | | | | 717/114 |
| 9,875,249 | B1 * | 1/2018 | Manville | G06F 16/2282 |
| 2004/0088505 | A1 * | 5/2004 | Watanabe | G06F 3/0608 |
| | | | | 711/161 |
| 2005/0216899 | A1 * | 9/2005 | Muthukumar | G06F 8/445 |
| | | | | 717/151 |
| 2005/0257096 | A1 * | 11/2005 | Kielstra | G06F 8/4441 |
| | | | | 714/42 |
| 2009/0064117 | A1 * | 3/2009 | Bashkansky | G06F 8/443 |
| | | | | 717/154 |
| 2013/0297722 | A1 * | 11/2013 | Wright | G06F 11/1469 |
| | | | | 709/217 |
| 2014/0358861 | A1 * | 12/2014 | Bhattacharjee | G06F 16/1873 |
| | | | | 707/638 |
| 2015/0074135 | A1 * | 3/2015 | Beavin | G06F 16/24534 |
| | | | | 707/759 |

(Continued)

*Primary Examiner* — Tuan A Pham
(74) *Attorney, Agent, or Firm* — Tutunjian & Bitetto, P.C.; Randall Bluestone

(57) ABSTRACT

A computer-implemented method for improving performance of data processing with nullable schema information by using a data processing framework is presented. The method includes reading, by the processor, data from one or more blocks forming a column, where the data is stored in a database including the one or more blocks and determining, by the processor, whether any row in each block of the one or more blocks includes null data. The computer-implemented method further includes executing, by the data processing framework, optimized code if the block does not include null data and executing, by the data processing framework, non-optimized code if the block includes null data.

16 Claims, 9 Drawing Sheets

FIG. 8

(56) References Cited

U.S. PATENT DOCUMENTS

| | | | |
|---|---|---|---|
| 2016/0110176 A1* | 4/2016 | Fink | G06F 8/443 |
| | | | 717/137 |
| 2016/0321046 A1* | 11/2016 | Pizlo | G06F 8/443 |
| 2017/0075966 A1* | 3/2017 | Greene | G06F 16/254 |
| 2017/0262769 A1* | 9/2017 | McShane | G06N 5/022 |
| 2017/0351991 A1* | 12/2017 | Halberstadt | G06F 16/254 |
| 2019/0079974 A1* | 3/2019 | Goergens | G06F 16/24524 |

\* cited by examiner

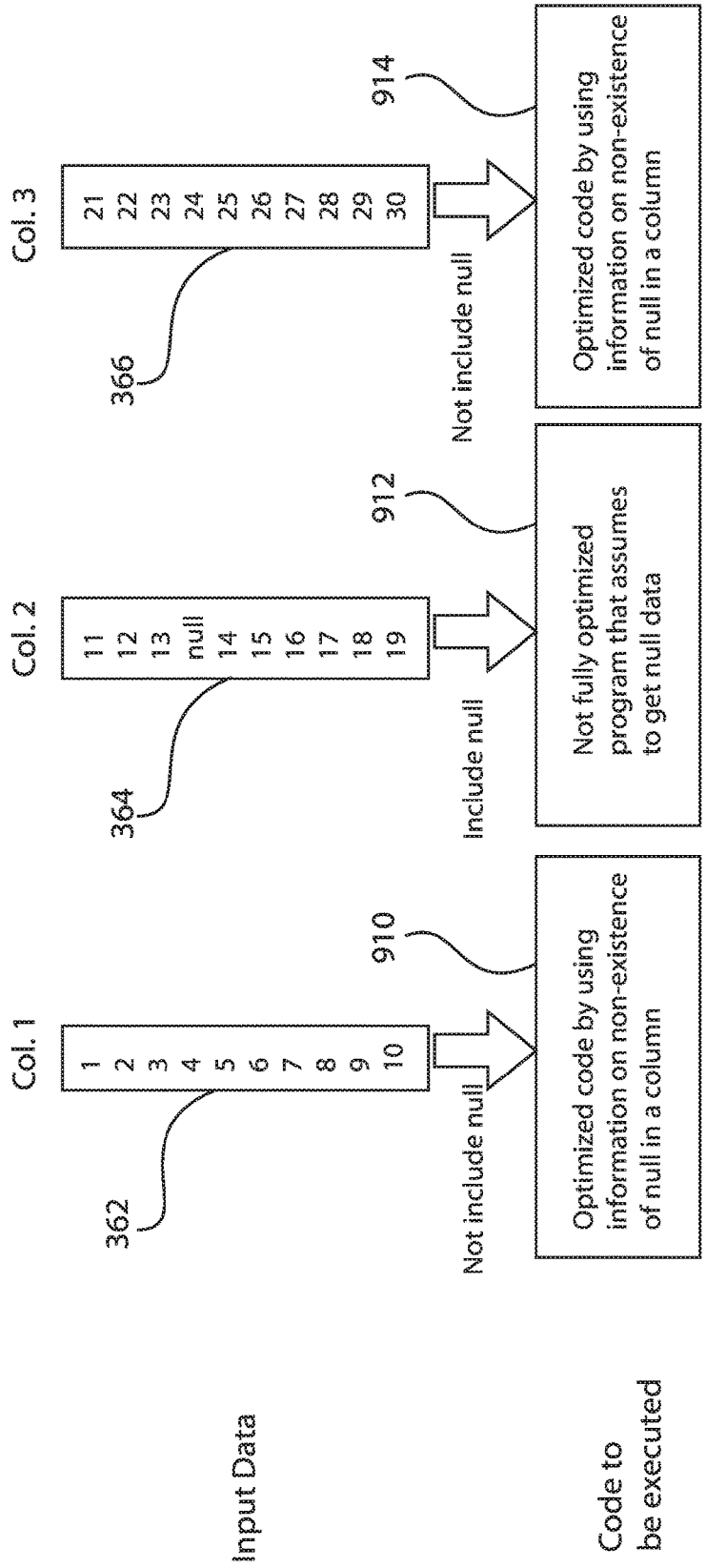

DATA PROCESSING WITH NULLABLE SCHEMA INFORMATION

BACKGROUND

Technical Field

The present invention relates generally to data processing, and more specifically, to data processing with nullable schema information.

Description of the Related Art

Computing system environments have become incredibly complicated as many involve a variety of types of hardware, software, nodes, use of external systems, and the like. It has become difficult to decipher when it is appropriate to take advantage of modernization techniques such as virtualization and cloud offloading and for what systems given the interdependency of various computational nodes and the difficulty of collecting, correlating, and analyzing the myriad of data needed to understand dynamic system behaviors and resource use.

SUMMARY

In accordance with one embodiment, a computer-implemented method executed by a processor for improving performance of data processing with nullable schema information by using a data processing framework is provided. The computer-implemented method includes reading, by the processor, data from one or more blocks forming a column, where the data is stored in a database including the one or more blocks and determining, by the processor, whether any row in each block of the one or more blocks includes null data. The computer-implemented method further includes executing, by the data processing framework, optimized code if the block does not include null data and executing, by the data processing framework, non-optimized code if the block includes null data.

In accordance with another embodiment, a computer system for improving performance of data processing with nullable schema information by using a data processing framework network is provided. The computer system includes a memory and at least one processor in communication with the memory, wherein the computer system is configured to read, by the processor, data from one or more blocks forming a column, where the data is stored in a database including the one or more blocks, determine, by the processor, whether any row in each block of the one or more blocks includes null data, execute, by the data processing framework, optimized code if the block does not include null data, and execute, by the data processing framework, non-optimized code if the block includes null data.

In accordance with yet another embodiment, a non-transitory computer readable storage medium comprising a computer readable program for improving performance of data processing with nullable schema information by using a data processing framework is provided. The non-transitory computer readable storage medium when executed on a computer causes the computer to perform the steps of reading, by the processor, data from one or more blocks forming a column, where the data is stored in a database including the one or more blocks, determining, by the processor, whether any row in each block of the one or more blocks includes null data, executing, by the data processing framework, optimized code if the block does not include null data, and executing, by the data processing framework, non-optimized code if the block includes null data.

Furthermore, embodiments can take the form of a related computer program product, accessible from a computer-usable or computer-readable medium providing program code for use, by or in connection with a computer or any instruction execution system. For the purpose of this description, a computer-usable or computer-readable medium may be any apparatus that may include means for storing, communicating, propagating or transporting the program for use, by or in a connection with the instruction execution system, apparatus, or device.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The invention will provide details in the following description of preferred embodiments with reference to the following figures wherein:

FIG. 8 is exemplary Spark source program and schema information, in accordance with an embodiment of the present invention;

FIG. 9 is three partitioned blocks for the columns of the dataset of FIG. 7, in accordance with an embodiment of the present invention;

Throughout the drawings, same or similar reference numerals represent the same or similar elements.

DETAILED DESCRIPTION

Figure 1:
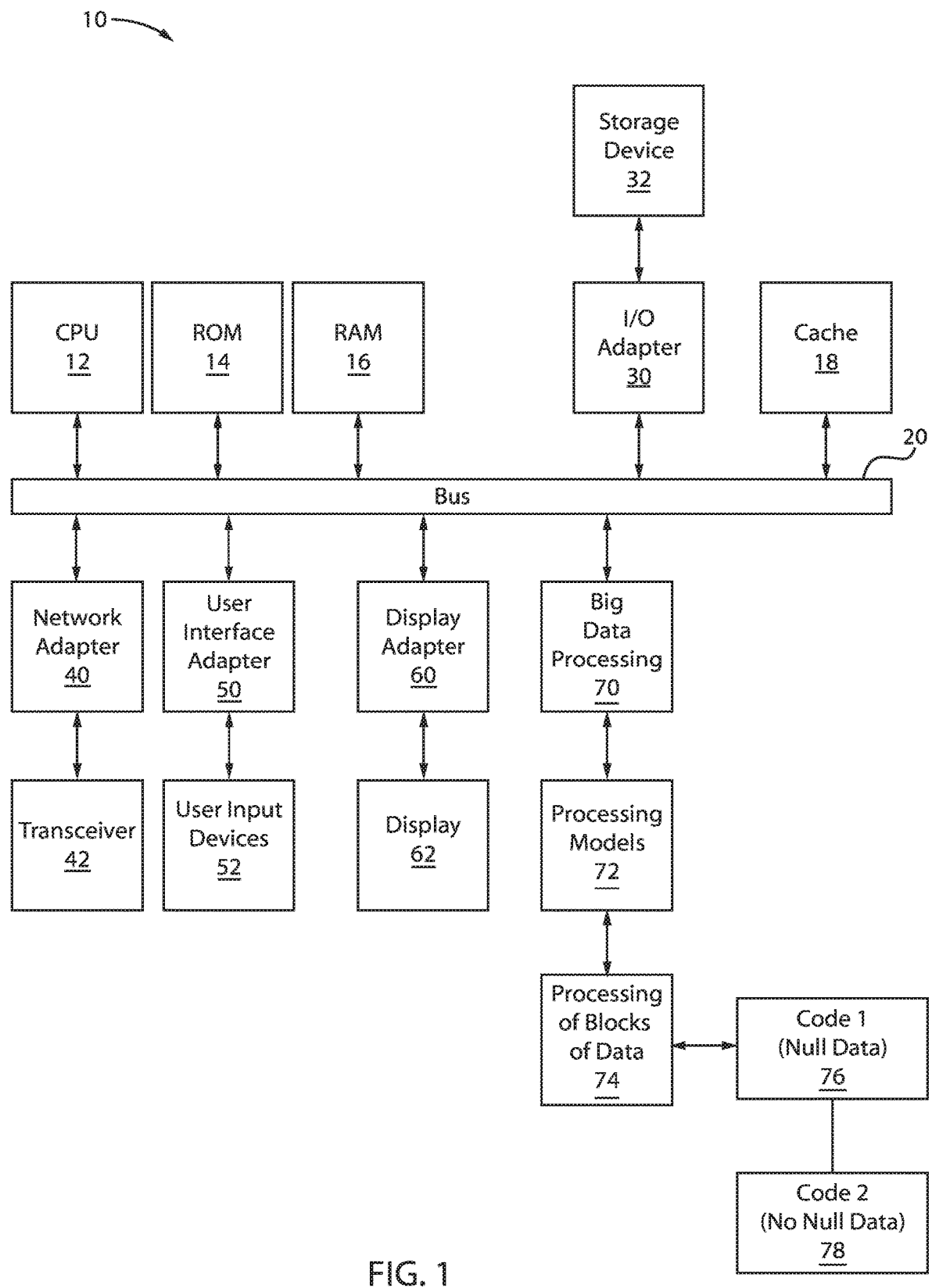
FIG. 1 is an exemplary processing system for processing of blocks of data including null data, in accordance with embodiments of the present invention.

Embodiments in accordance with the present invention provide methods and devices for big data processing. Big data processing can be executed by different processing models, such as batch processing and real-time processing. The processing models process blocks of data. The blocks of data can be evaluated for determining whether null data exists or not. A value of null means that the value is unknown, undefined, or uninitialized. Null values can arise when a reference is made to message fields that do not exist, database columns are accessed for which no data has been supplied, or a keyword NULL is employed, which supplies a null literal value.

Embodiments in accordance with the present invention provide methods and devices for big data processing by employing a data processing framework which processes data in a table. One such data processing framework is called Apache™ Spark. Apache™ Spark is a cluster computing engine that can optimize code based on schema information of the table. Spark is designed to be highly accessible, offering simple application programming interfaces (APIs) in Python®, Java®, Scala®, and structured query language (SQL), and rich built-in libraries. Spark also integrates closely with other Big Data tools. In particular, Spark can run in Hadoop® clusters and access any Hadoop® data source.

On the speed side, Spark extends a MapReduce™ model to efficiently support more types of computations, including interactive queries and stream processing. Speed is important in processing large datasets, as it means the difference between exploring data interactively and waiting minutes or hours. One of the main features Spark offers for speed is an ability to run computations in memory, but the system is also more efficient than MapReduce™ for complex applications running on disk.

On the generality side, Spark is designed to cover a wide range of workloads that previously needed separate distributed systems, including batch applications, iterative algorithms, interactive queries, and streaming. By supporting these workloads in the same engine, Spark makes it easy and inexpensive to combine different processing types, which is often necessary in production data analysis pipelines. In addition, Spark reduces the management burden of maintaining separate tools.

Embodiments in accordance with the present invention provide methods and devices for processing data in a table where if a flag, which indicates the schema information has that data in a column can have null (referred to as "nullable"), is true, the framework generates non-optimized code. If the framework knows the nullable flag is false, the framework can generate optimized code by using the schema information on non-existence of null data in a column. When data size in a column is large, data is stored into multiple blocks. Thus, a data processing framework reads and processes data in each block. For each block that includes data to be processed, this invention examines whether any null data exists or not. Based on the existence of null data, the present invention executes appropriate code. Thus, the present invention can generate optimized code even if "nullable" exists for a column in the schema information.

Embodiments in accordance with the present invention provide methods and devices for employing Spark with optimized code even if nullable exists for a column in the schema information to enable and optimize Internet of Things (IoT) applications.

The Internet of Things (IoT) enables advanced connectivity of computing and embedded devices through internet infrastructure. IoT involves machine-to-machine communications (M2M), where it is important to continuously monitor connected machines to detect any anomaly or bug, and resolve them quickly to minimize downtime. Logging is a commonly used mechanism to record machines' behaviors and various states for maintenance and troubleshooting. Logs provide a continuous snapshot of the system behaviors and by analyzing log contents, any activity of interest can be troubleshooted.

IoT is an advanced automation and analytics system which exploits networking, sensing, big data, and artificial intelligence technology to deliver complete systems for a product or service. These systems allow greater transparency, control, and performance when applied to any industry or system.

IoT systems have applications across industries through their unique flexibility and ability to be suitable in any environment. IoT systems enhance data collection, automation, operations, and much more through smart devices and powerful enabling technology. IoT systems allow users to achieve deeper automation, analysis, and integration within a system. IoT systems improve the reach of these areas and their accuracy. IoT utilizes existing and emerging technology for sensing, networking, and robotics. Features of IoT include artificial intelligence, connectivity, sensors, active engagement, and small device use. In various exemplary embodiments, the Apache™ Spark data processing systems of the present invention can be incorporated into a variety of different IoT devices and/or IoT systems.

It is to be understood that the present invention will be described in terms of a given illustrative architecture; however, other architectures, structures, substrate materials and process features and steps/blocks can be varied within the scope of the present invention. It should be noted that certain features cannot be shown in all figures for the sake of clarity. This is not intended to be interpreted as a limitation of any particular embodiment, or illustration, or scope of the claims.

Referring now to the drawings in which like numerals represent the same or similar elements and initially to FIG. 1, an exemplary processing system 10 for processing of blocks of data including null data is presented, in accordance with embodiments of the present invention.

The processing system 10 includes at least one processor (CPU) 12 operatively coupled to other components via a system bus 20. A cache 18, a Read Only Memory (ROM) 14, a Random Access Memory (RAM) 16, an input/output (I/O) adapter 30, a network adapter 40, a user interface adapter 50, and a display adapter 60 are operatively coupled to the system bus 20. Additionally, a big data processing block 70 is operatively coupled to the system bus 20. The big data processing block 70 uses different processing models 72 to process blocks of data 74. The blocks of data 74 are processed for determining whether null data 76 exists or whether there is no null data 78.

A storage device 32 is operatively coupled to system bus 20 by the I/O adapter 30. The storage device 32 can be any of a disk storage device (e.g., a magnetic or optical disk storage device), a solid state magnetic device, and so forth.

A transceiver 42 is operatively coupled to system bus 20 by network adapter 40.

User input devices 52 are operatively coupled to system bus 20 by user interface adapter 50. The user input devices 52 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 52 can be the same type of user input device or different types of user input devices. The user input devices 52 are used to input and output information to and from the processing system.

A display device 62 is operatively coupled to system bus 20 by display adapter 60.

Of course, the nullable schema information processing system 10 may also include other elements (not shown), as readily contemplated by one of skill in the art, as well as omit certain elements. For example, various other input devices and/or output devices can be included in the nullable schema information processing system 10, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the nullable schema information processing system 10 are readily contemplated by one of ordinary skill in the art given the teachings of the present invention provided herein.

Figure 2:
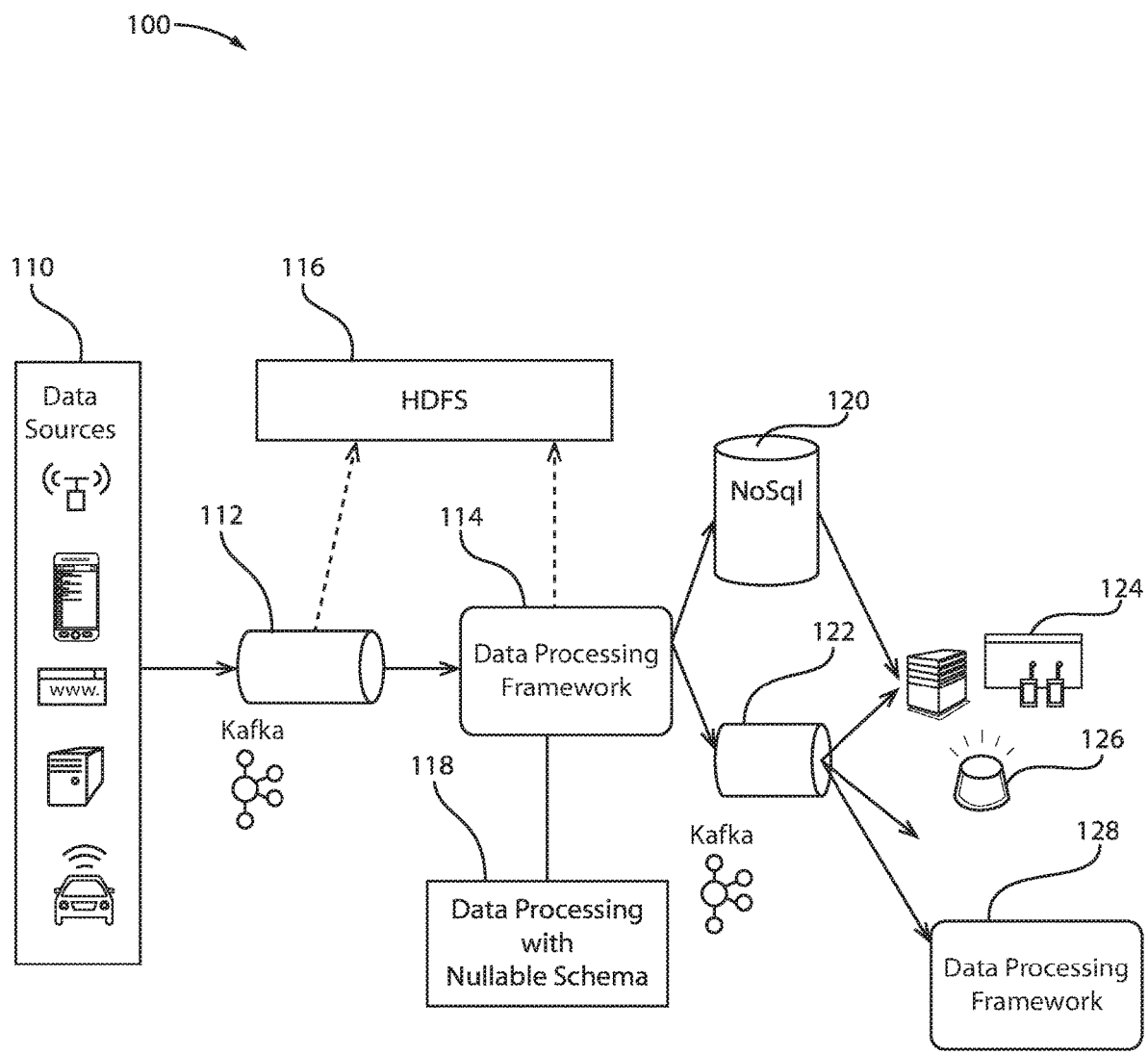
FIG. 2 is a block/flow diagram of an exemplary nullable schema processing architecture, in accordance with an embodiment of the present invention.

FIG. 2 is a block/flow diagram of an exemplary nullable schema processing architecture, in accordance with an embodiment of the present invention.

The nullable schema processing architecture 100 includes data sources 110 that provide data to a message bus 112, such as Kafka®. The message bus 112 communicates with the HDFS 116 and Spark 114.

The data sources 110 are sources of data streams. This is raw data. A data source 110 can be a sensor network, or a mobile application, or a web client, or a log from a server, or even a "thing" from the Internet of Things (IoT).

The message bus 112 is a reliable, high-throughput and low latency messaging system. Kafka® and Flume® are good choices for such message bus 112.

A processing system 114, such as, but not limited to, Spark is a more accessible, powerful and capable big data tool for tackling various big data challenges. Spark is a computation framework capable of doing computations on data streams. However, one skilled in the art can contemplate employing other computations frameworks other than Spark. Nonetheless, with more than 500 contributors from across 200 organizations responsible for code and a user base of 225,000+ members, Apache™ Spark has become mainstream and most in-demand big data framework across all major industries. Processing system 114 has a well-defined and layered architecture where all the spark components and layers are loosely coupled and integrated with various extensions and libraries. Apache™ Spark Architecture is based on two main abstractions, that is Resilient Distributed Datasets (RDD) and Directed Acyclic Graph (DAG).

The processing system 114 can communicate with a source for data processing with nullable schema 118. Thus, optimized code, even if nullable exists for a column in the schema information, can be integrated with the processing system 114. A schema includes a record (or row) definition. This describes each column (or field) that will be encountered within the record, giving column name and data type. Schemas are an alternative way for a user to specify column definitions for the data used by parallel jobs. By default, most parallel job stages take their metadata from the columns tab, which includes table definitions, supplemented, where necessary by format information from the format tab. For some stages, the user can specify a property that causes the stage to take its metadata from the specified schema file instead. Some stages also allow the user to specify a partial schema. This allows the user to describe only those columns that a particular stage is processing and ignore the rest.

Processing system 114 can then communicate with a non-relational structured query language (NoSQL) storage block 120, where processed data of no use is sent if the processed data does not serve end applications or users. End applications perform fast read and writes.

In one exemplary embodiment, processing system 114 can communicate with another message bus 122. Then such processed data can be provided to end applications 124, 126, 128, which are applications that consume the processed data/results. End application 124 can be computing devices, such as lap tops or mobile devices, end application 126 can be systems providing alerts, and end application 128 can be another processing system, such as, but not limited to, Spark.

Figure 3:
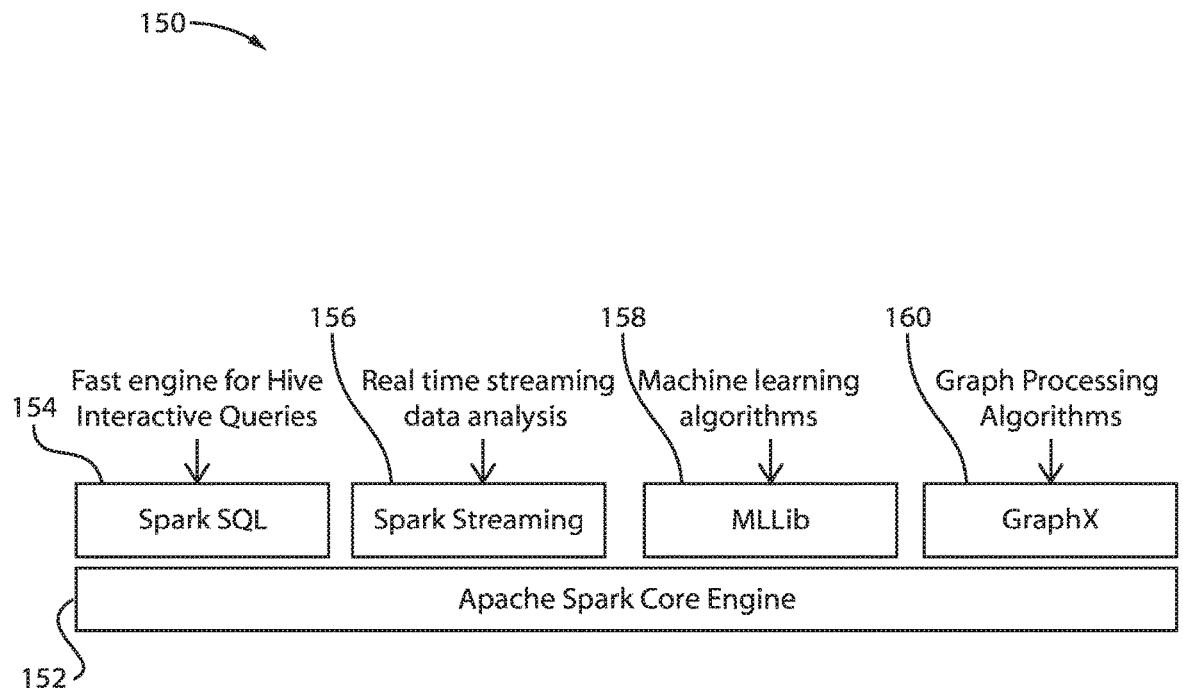
FIG. 3 is a block/flow diagram of exemplary top-level components of an Apache™ Spark stack, in accordance with an embodiment of the present invention.

FIG. 3 is a block/flow diagram of exemplary top-level components 150 of an Apache™ Spark stack, in accordance with an embodiment of the present invention.

Apache™ Spark is an open source, Hadoop®-compatible, fast and expressive cluster-computing platform. It was created at AMPLabs in UC Berkeley as part of Berkeley Data Analytics Stack (BDAS). It has emerged as a top level Apache™ project. FIG. 3 illustrates the various components of the current Apache™ Spark stack.

The Spark project includes multiple closely integrated components. At its core, Spark is a "computational engine" that is responsible for scheduling, distributing, and monitoring applications including many computational tasks across many worker machines, or a computing cluster. Because the core engine of Spark is both fast and general-purpose, it powers multiple higher-level components specialized for various workloads, such as structured query language (SQL) or machine learning. These components are designed to interoperate closely, letting a user combine them like libraries in a software project.

A philosophy of tight integration has several benefits. First, all libraries and higher-level components in the stack benefit from improvements at the lower layers. For example, when Spark's core engine adds an optimization, SQL and machine learning libraries automatically speed up as well. Second, costs associated with running the stack are minimized, because instead of running 5-10 independent software systems, an organization needs to run only one. These costs include deployment, maintenance, testing, support, and others. This also means that each time a new component is added to the Spark stack, every organization that uses Spark will immediately be able to try this new component.

Finally, one of the largest advantages of tight integration is an ability to build applications that seamlessly combine different processing models. For example, in Spark a user can write one application that uses machine learning to classify data in real time as it is ingested from other sources. Simultaneously, analysts can query the resulting data, also in real time, via SQL (e.g., to join the data with unstructured log files).

The Spark Core 152 includes the basic functionality of Spark, including components for task scheduling, memory management, fault recovery, interacting with storage systems, and more. Spark Core is also home to the application programming interface (API) that defines resilient distributed datasets (RDDs), which are Spark's main programming abstraction. RDDs represent a collection of items distributed across many compute nodes that can be manipulated in parallel. Spark Core provides many APIs for building and manipulating these collections.

The Spark SQL 154 is Spark's package for working with structured data. It allows querying data via SQL as well as the Apache™ Hive variant of SQL, called the Hive Query Language (HQL), and it supports many sources of data, including Hive tables, and Parquet. Beyond providing a SQL interface to Spark, Spark SQL allows developers to intermix SQL queries with the programmatic data manipulations supported by RDDs in Python®, Java®, and Scala®, all within a single application, thus combining SQL with complex analytics.

The Spark Streaming 156 is a Spark component that enables processing of live streams of data. Examples of data streams include log files generated by production web servers, or queues of messages including status updates posted by users of a web service. Spark Streaming 156 provides an API for manipulating data streams that closely matches the Spark Core's RDD API, making it easy for programmers to learn the project and move between applications that manipulate data stored in memory, on disk, or arriving in real time. Underneath its API, Spark Streaming 156 was designed to provide the same degree of fault tolerance, throughput, and scalability as Spark Core.

Spark comes with a library including machine learning (ML) functionality, called MLlib 158. MLlib 158 provides multiple types of machine learning algorithms, including classification, regression, clustering, and collaborative filtering, as well as supporting functionality such as model evaluation and data import. MLlib 158 also provides some lower-level ML primitives, including a generic gradient descent optimization algorithm. All of these methods are designed to scale out across a cluster.

GraphX 160 is a library for manipulating graphs (e.g., a social network's friend graph) and performing graph-parallel computations. Like Spark Streaming 156 and Spark SQL 154, GraphX 160 extends the Spark RDD API, allowing users to create a directed graph with arbitrary properties attached to each vertex and edge.

The main benefits of Apache™ Spark include:

(1) Lightning speed of computation because data are loaded in distributed memory (RAM) over a cluster of machines. Data can be quickly transformed iteratively and cached on demand for subsequent usage. It has been noted that Apache™ Spark processes data 100× faster than Hadoop® MapReduce™ when all the data fits in memory and 10× faster when some data spills over onto disk because of insufficient memory.

(2) Highly accessible through standard APIs built in Java®, Scala®, Python®, SQL (for interactive queries) and has rich set of machine learning libraries available out of the box.

(3) Compatibility with existing Hadoop® v1 (SIMR) and 2.x (YARN) ecosystems so companies can leverage their existing infrastructure.

(4) Convenient download and installation processes. Convenient shell (REPL: Read-Eval-Print-Loop) to interactively learn the APIs.

(5) Enhanced productivity due to high level constructs that keep the focus on content of computation.

Moreover, Spark is designed to efficiently scale up from one to many thousands of compute nodes. To achieve this while maximizing flexibility, Spark can run over a variety of cluster managers, including Hadoop® YARN, Apache™ Mesos, and a simple cluster manager included in Spark itself called the Standalone Scheduler.

Figure 4:
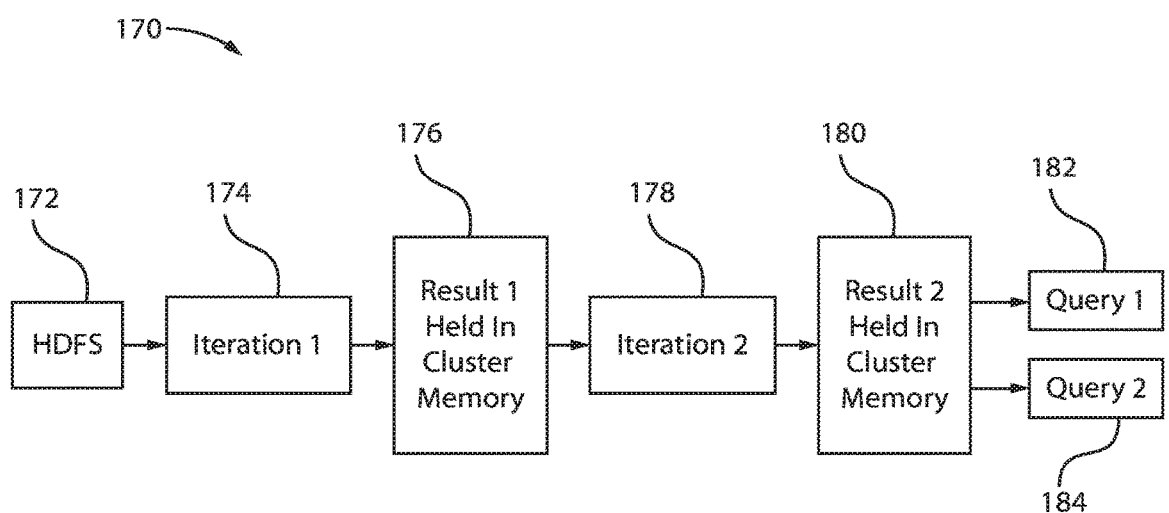
FIG. 4 is a block/flow diagram of how an Apache™ Spark job processes information, in accordance with an embodiment of the present invention.

FIG. 4 is a block/flow diagram 170 of how an Apache™ Spark job processes information, in accordance with an embodiment of the present invention.

Apache™ Hadoop® provides two major capabilities: (1) a Hadoop® Distributed File System (HDFS), which is a fault tolerant way to store vast amounts of data inexpensively using horizontally scalable commodity hardware and (2) a MapReduce™ computing paradigm, which provide programming constructs to mine data and derive insights. FIG. 4 illustrates how data are processed through a series of Map-Reduce steps where an output of a MapReduce™ step is input to the next in a conventional Hadoop® job.

MapReduce™ is the heart of Apache™ Hadoop®. It is this programming paradigm that allows for massive scalability across hundreds or thousands of servers in a Hadoop® cluster. The term MapReduce™ actually refers to two separate and distinct tasks that Hadoop® programs perform. The first is the map job, which takes a set of data and converts it into another set of data, where individual elements are broken down into tuples (key/value pairs). The reduce job takes the output from a map as input and combines those data tuples into a smaller set of tuples. As the sequence of the name MapReduce™ implies, the reduce job is always performed after the map job.

MapReduce™ conveniently computes huge amounts of data by the applications of mapping and reducing steps in order to come up with the solution for a problem. The mapping step takes a set of data in order to convert the set of data into another set of data by breaking the individual elements in to key/value pairs called tuples. The second step of reducing takes the output derived from the mapping process and combines the data tuples into a smaller set of tuples.

In various exemplary embodiments, a job is processed as follows:

The HDFS 172 reads a first iteration 174. The first iteration 174 can include, e.g., splitting, mapping, shuffling, and reducing operations. The results 176 of the first iteration 174 are held in a cluster memory. Then a second iteration 178 can take place. The result 180 of the second iteration 178 can be written in another HDFS, which reads queries 182, 184. In it noted that one skilled in the art can contemplate executing a number of iterations during the processing job.

Therefore, regarding the mapping stage, this is the first step of the MapReduce™ and the mapping stage includes the process of reading the information from the Hadoop® Distributed File System (HDFS) 172. The data could be in the form of a directory or a file. The input data file is fed into the mapper function of the first iteration 174 one line at a time. The mapper then processes the data and reduces it into smaller blocks of data.

Regarding the reducing stage, the reducer phase can include multiple processes. In the shuffling process, the data is transferred from the mapper to the reducer. Without successful shuffling of the data, there would be no input to the reducer phase. However, the shuffling process can start even before the mapping process has completed. Next the data is sorted in order to lower a time taken to reduce the data. The sorting helps the reducing process by providing a cue when a next key in the sorted input data is distinct from a previous key. The reduce task needs a specific key-value pair in order to call the reduce function that takes the key-value as its input. The output from the reducer can be directly deployed to be stored in the HDFS 172.

Therefore, Hadoop® MapReduce™ is a software framework 170 for easily writing applications which process vast amounts of data (multi-terabyte data-sets) in-parallel on large clusters (thousands of nodes) of commodity hardware in a reliable, fault-tolerant manner. A MapReduce™ job splits the input data-set into independent chunks which are processed by the map tasks in a completely parallel manner. The framework 170 sorts the outputs of the maps, which are then input to the reduce tasks. Usually both the input and the output of the job are stored in a file-system. The framework 170 takes care of scheduling tasks, monitoring them, and re-executes the failed tasks. Usually the compute nodes and the storage nodes are the same, that is, the MapReduce™ framework 170 and the HDFS 172 are running on the same set of nodes. This configuration allows the framework to effectively schedule tasks on the nodes where data is already present, resulting in very high aggregate bandwidth across the cluster.

Figure 5:
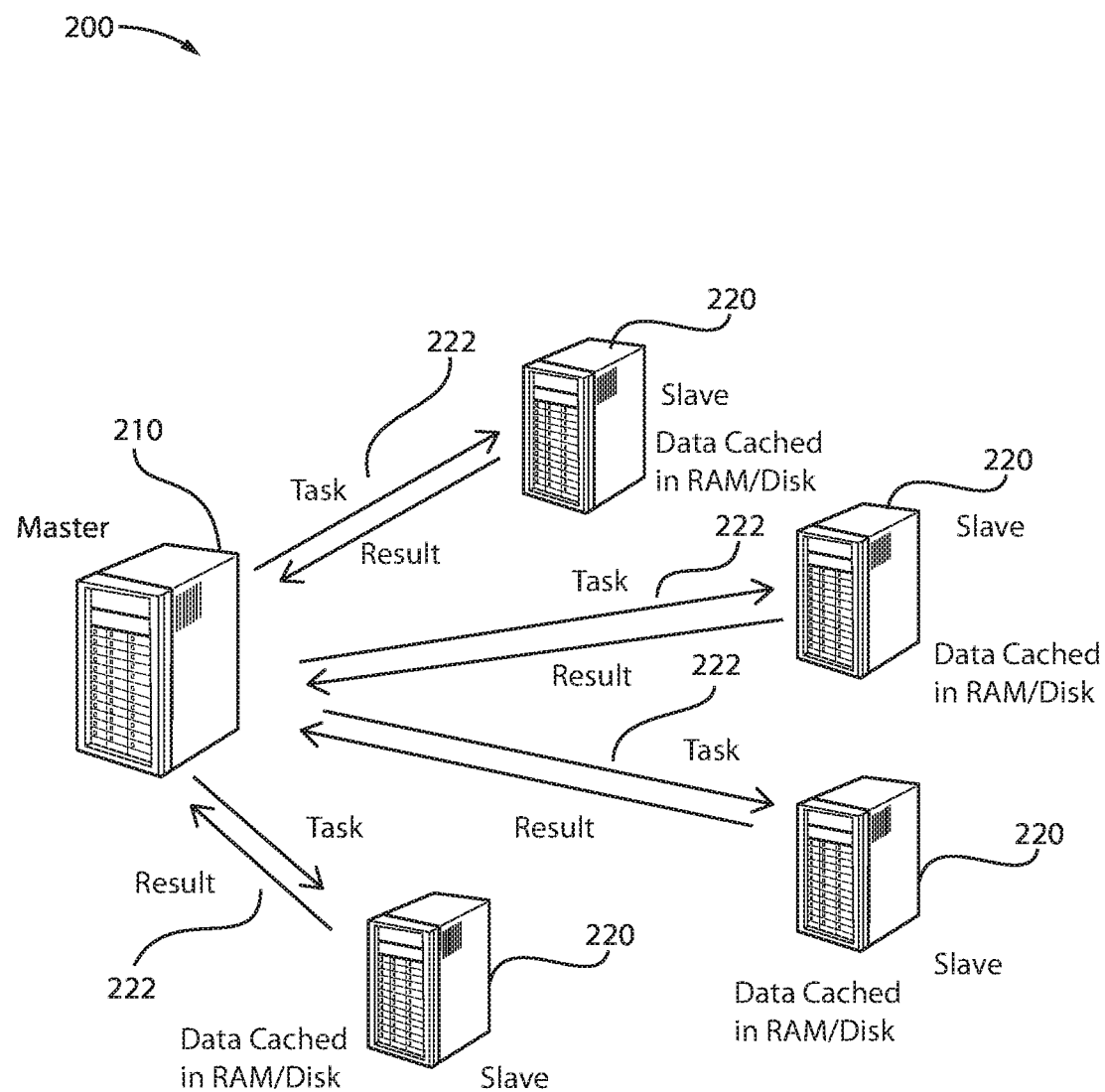
FIG. 5 is a schematic diagram of how Apache™ Spark executes a job on a cluster, in accordance with an embodiment of the present invention.

FIG. 5 is a schematic diagram 200 of how Apache™ Spark executes a job on a cluster, in accordance with an embodiment of the present invention.

Apache™ Spark follows a master/slave architecture with two main daemons and a cluster manager, that is Master Daemon 210—(Master/Driver Process) and Worker Daemon 220—(Slave Process). A spark cluster has a single Master 210 and any number of Slaves/Workers 220 for communication therewith. The communication is a two-way communication 222 that involves the exchange of tasks and results. The driver and the executors run their individual Java® processes and users can run them on the same horizontal spark cluster or on separate machines.

The Master 210 controls how data is partitioned, and the Master 210 takes advantage of data locality while keeping track of all the distributed data computation on the Slave machines 220. If a certain Slave machine 220 is unavailable, the data on that machine is reconstructed on other available machine(s).

Figure 6:
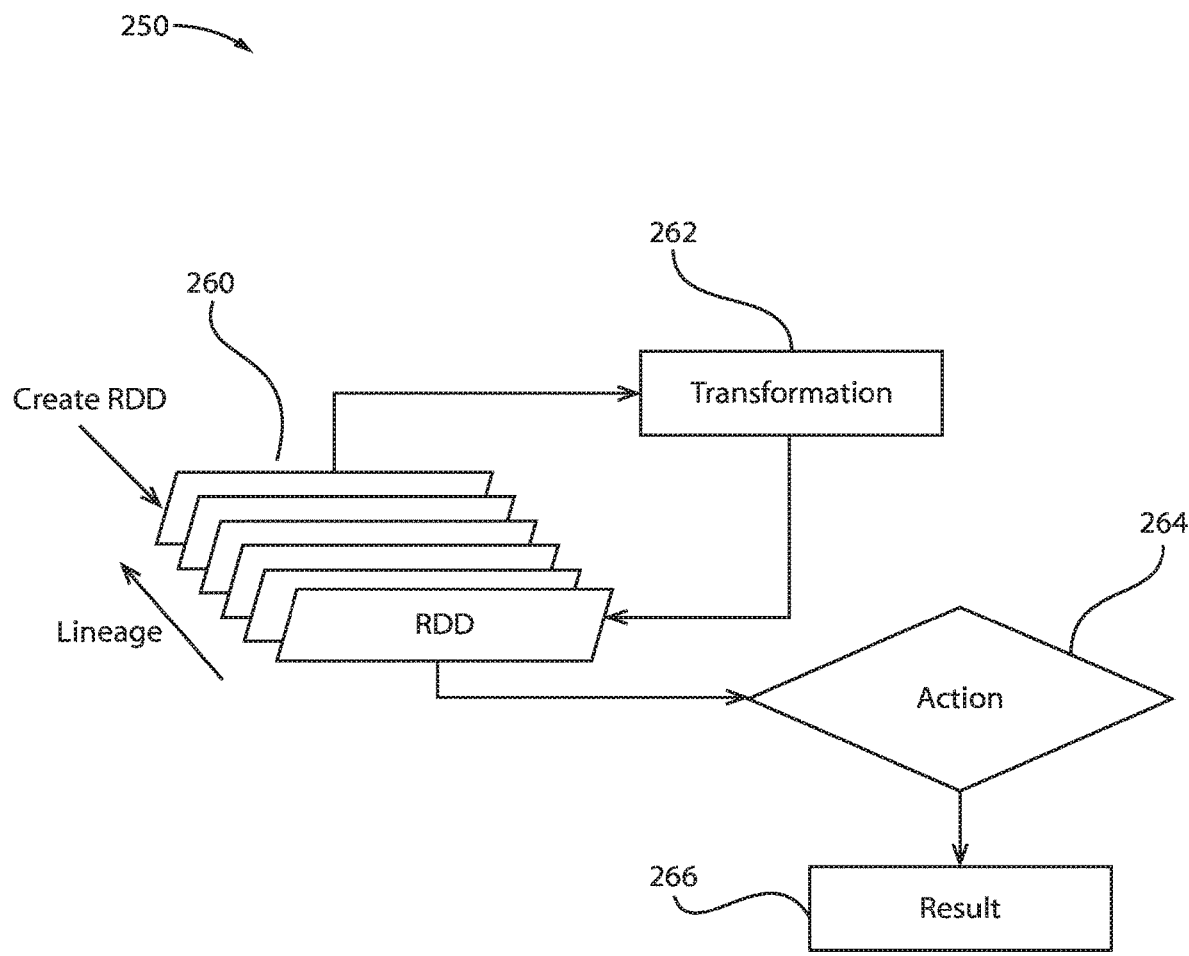
FIG. 6 is a schematic diagram of how transformations are evaluated, in accordance with an embodiment of the present invention.

FIG. 6 is a schematic diagram 250 of how transformations are evaluated, in accordance with an embodiment of the present invention.

One example API in Apache™ Spark is a resilient distributed dataset (RDD) 260. RDD 260 is an immutable distributed collection of data, which is partitioned across machines in a cluster. RDD 260 facilitates two types of operations, that is, transformation 262 and action 264. A transformation 262 is an operation such as filter( ) map( ) or union( ) on an RDD 260 that yields another RDD 260. First( ), take(n), or collect( ) that triggers a computation, returns a value or result 266 back to the Master 210 (FIG. 5), or writes to a stable storage system. Spark Master/Driver 210 remembers the transformations 262 applied to an RDD 260, so if a partition is lost (say a slave machine 220 goes down), that partition can easily be reconstructed on some other machine in the cluster. In an alternative embodiment, one skilled in the art can contemplate or envision incorporating RDD concepts herein. However, the exemplary embodiments of the present invention focus on data frame and data set APIs, as described below.

Figure 7:
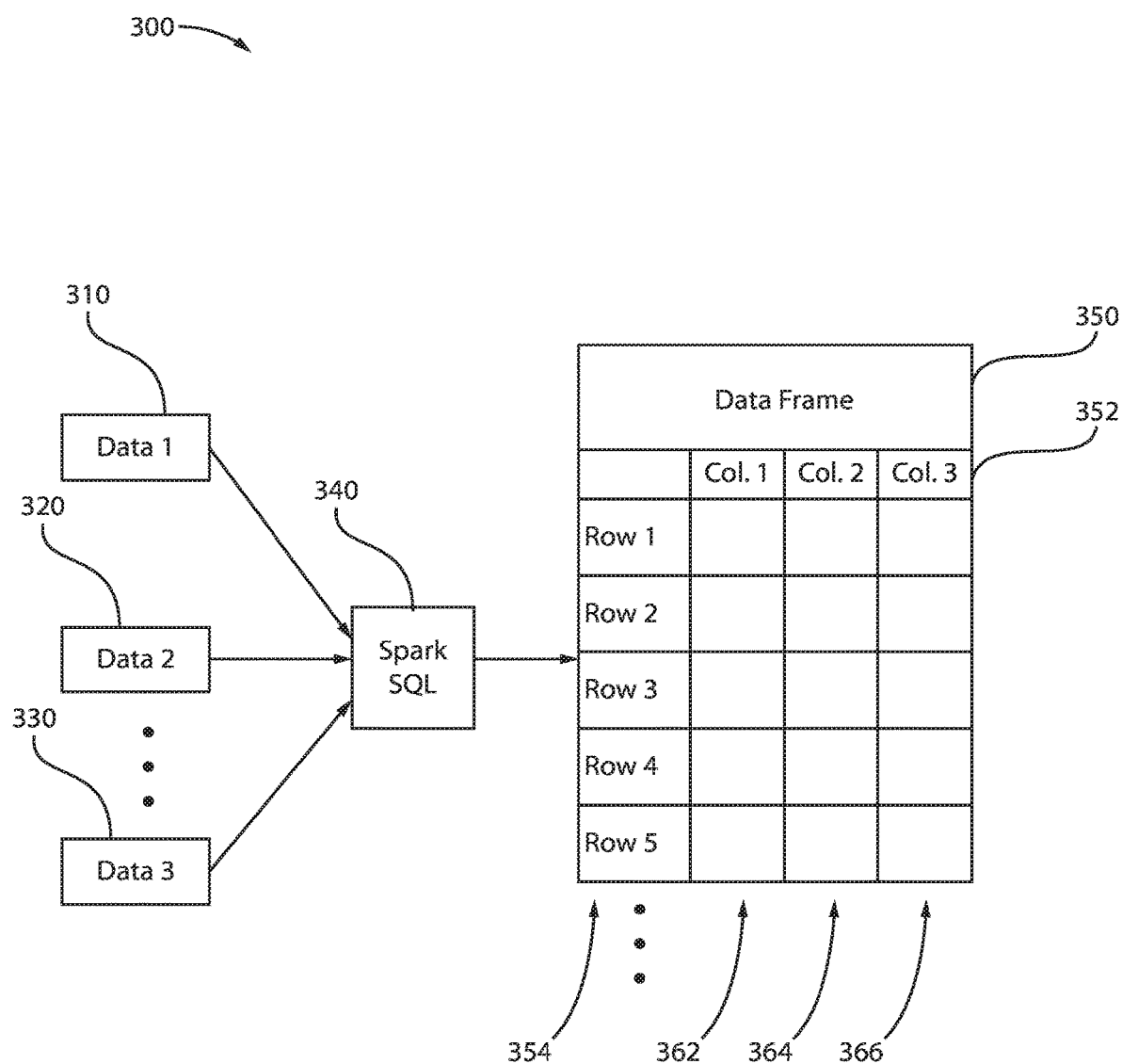
FIG. 7 is a schematic diagram of how a dataset including rows and columns is created, in accordance with an embodiment of the present invention.

FIG. 7 is a schematic diagram 300 of how a data frame 350 including rows and columns is created, in accordance with an embodiment of the present invention.

In various exemplary embodiments, data 310, 320, 330 is collected and provided to the Spark SQL 340. The Spark SQL 340 can then create a data frame 350 including a plurality of columns 352 and a plurality of rows 354. The first column can be designated as 362, the second column can be designated as 364, and the third column can be designated as 366. The data frame 350 is used for storing data tables. The data frame 350 is a list of vectors of equal length. The top line of the table, called the header, includes the column names. Each horizontal line afterward denotes a data row, which begins with the name of the row, and then followed by the actual data. Each data member of a row is called a cell. In one example, to retrieve data in a cell, row and column coordinates can be entered in the single square bracket "[ ]" operator. Of course, one skilled in the art can contemplate other methods to accomplish the data retrieval process. In this example, the two coordinates can be separated by a comma. In other words, the coordinates begin with row position, then followed by a comma, and end with the column position.

FIG. 8 is exemplary Spark source program and schema information, in accordance with an embodiment of the present invention.

In one example, the Spark source program 810 can be given as:
　　val df=sq1Context.read.parquet(DIRPATH)
　　df.agg(sum("id"))
In one example, the Spark schema information 820 can be given as:
　　Root
　　+– id: int (nullable=true)

FIG. 9 is three partitioned blocks for the columns of the dataset of FIG. 7, in accordance with an embodiment of the present invention.

In various exemplary embodiments, the first column 362 includes data 1, 2, 3, 4, 5, 6, 7, 8, 9, 10. The second column 364 includes data 11, 12, 13, null, 14, 15, 16, 17, 18, 19. The third column 366 includes data 21, 22, 23, 24, 25, 26, 27, 28, 29, 30. Thus, the first and third columns 362, 366 do not include any null values. However, the second column 364 does include a null value.

For each block that includes data to be processed, the present invention examines whether any null data exists or not. Based on the existence of null data, the present invention executes appropriate code. The data for one or more columns is read from each block when all of the data are stored into one or more than one block. Subsequently, a determination is made as to whether any row in each block has a null or not.

The following are possible variations of when this determination is performed. For example, when a subquery (inner/nested query) is executed, this invention can skip the determination step if its main query uses output of the subquery. Additionally, this determination is performed when storing data that is read from a file or standard input into a data structure of the framework, when a query, which scans a part of a column or the whole column, is executed, when an index is created, and when a schema is updated. In addition, the present invention can reduce the investigation or determination cost by storing and reusing this investigation or determination result for each block, each column, or each other unit.

Therefore, different code is executed for the second column 364. For example, optimized code 910, 914 can be executed for Rows 1 and 2 in the first block and Rows 4 and 5 in the third block, respectively, whereas not fully optimized code 912 can be executed for Row 3 in the second block. The optimized code 910, 914 can be the same code. However, in another exemplary embodiment, such optimized codes 910, 914 can be different. In the instant case, the optimized codes 910, 914 are both the same and use information on non-existence of null in a column. The not fully optimized code used for the second column 364 can assume to get null data.

As a result, when the block does not have null data in the column, the system executes optimized code based on the information on non-existence of null data in the column. When the block has null data in the column, the system executes non-optimized code due to the existence of null data in the column.

Exemplary optimized code 910, 914 can be as follows:

---
Optimized code by using information on non-existence of null in a column

```
private void doAggregate( ) {
   ColumnVector column = ... // A structure to hold data in a column
   long agg_bufValue = 0L;
   int numRows = column.numRows( );
   int scan_localEnd = numRows - scan_batchIdx;
   for (int scan_localIdx = 0; scan_localIdx < scan_localEnd; lIdx++) {
      int scan_rowIdx = scan_batchIdx + scan_localIdx;
      long value = column.getLong(scan_rowIdx);
      agg_bufValue = agg_bufValue + value;
   }
}
```
---

In the optimized code, a for-loop does not include any conditional branch. Thus, it is expected to apply advanced compiler optimizations such as loop unrolling and simdization by a Java® just-in-time compiler.

Exemplary not fully optimized code 912 can be as follows:

---
Not fully optimized code due to possibility of null existence in a column

```
private void doAggregate( ) {
   ColumnVector column = ... // A structure to hold data in a column
   long agg_bufValue = 0L;
   int numRows = column.numRows( );
   int scan_localEnd = numRows - scan_batchIdx;
   for (int scan_localIdx = 0; scan_localIdx < scan_localEnd; lIdx++) {
      int scan_rowIdx = scan_batchIdx + scan_localIdx;
      boolean isNull = column.isNullAt(scan_rowIdx);
      long value = isNull ? -1 : column.getLong(scan_rowIdx);
      if (isNull) continue;
      agg_bufValue = agg_bufValue + 1L;
   }
}
```
---

Therefore, Apache™ Spark generates executable code based on the information on each column. Thus, if nullable for a column in the schema information exists, Apache™ Spark executes code that is not fully executed due to existence of null data. The present invention can thus generate optimized code even if nullable for a column in the schema information exists.

Regarding FIGS. 1-9, the methods described herein can be used in various applications, such as, e.g., in IBM's mainframes and servers, which include SIMD architectures. One such mainframe can be, e.g., the z13 mainframe. The z13 platform brings to bear a new architectural extension with instructions that allow reduced processor quiesce effects, lower cache misses, lower pipeline disruption, and increased parallelism with instructions that process several operands in a single instruction. Such mainframe systems could substantially benefit from SIMD processors that incorporate nullable schema information. The z13 superscaler processor has 32 vector registers that include an instruction set including 139 new instructions. The enhanced instruction set allows a better flow for increased number of operands to be processed in a single instruction. This is all intended to provide support for increased analytic processing. With the boom in big data and analytics, the SIMD processor of the exemplary embodiments of the present invention that incorporate nullable schema information can increase computational speed of such mainframes and/or servers. SIMD instructions improve the performance of complex mathematical models as well as permitting the integration of business models and analytic workloads on z Systems or mainframes in general. This all spells speed of processing.

The 32 new vector registers each have 128 bits. The 139 new instructions work on string operations, vector floating point operations and vector integer operations. Each register has multiple data elements of a fixed size. The code in the instructions shows the data format and the size of the elements. The elements can be in byte (168-bit operands), halfword (eight 16-bit operands), word (four 32-bit operands), doubleword (two 64-bit operands) or quadword (one 128-bit operand). The collection of the elements in a register is called a vector. All of the enhancements to the notion of vector processing can be used for increased speed with the processing of analytics-based use cases in utilizing SIMD architecture, such as the one described in the exemplary embodiments of the present invention where the Spark workloads are incorporated. This gives the ability to accelerate Spark workloads by using new instructions that act on many data elements at once. This can even occur at the single instruction level. This can help an organization meet shrinking batch windows by increasing throughput times. This helps the workloads keep up with new incoming transactions and allows extraction of real-time insight from consumer and financial transactions.

Another benefit with the SIMD architecture incorporating nullable schema information is that the SIMD architecture allows workloads from earlier z Systems servers to run unchanged on the z13 mainframe. Spark workloads can now also be changed and enabled for higher throughput with SIMD acceleration. The SIMD processor of the exemplary embodiments has some very interesting opportunities with processing applications related to analytics, as throughput is important to harvest the insight of the transaction. Analytic transactions can be run in close proximity to z Systems data with efficiency and maximum performance. This also increases programmer productivity when developing analytics workloads where speed and performance optimization is paramount.

Therefore, the SIMD architecture incorporating nullable schema information disclosed herein can either supplement current SIMD processors or replace current SIMD processors in order to optimize performance by incorporating Spark workloads. The SIMD architecture described herein can also be used in graphics processing units (GPUs) and other types of 3D graphics processing implementations. Of course, one skilled in the art can contemplate incorporating the SIMD architecture incorporating nullable schema information described herein into any type of processing unit that can be incorporated into any type of computing system for any type of application without any limitation.

Figure 10:
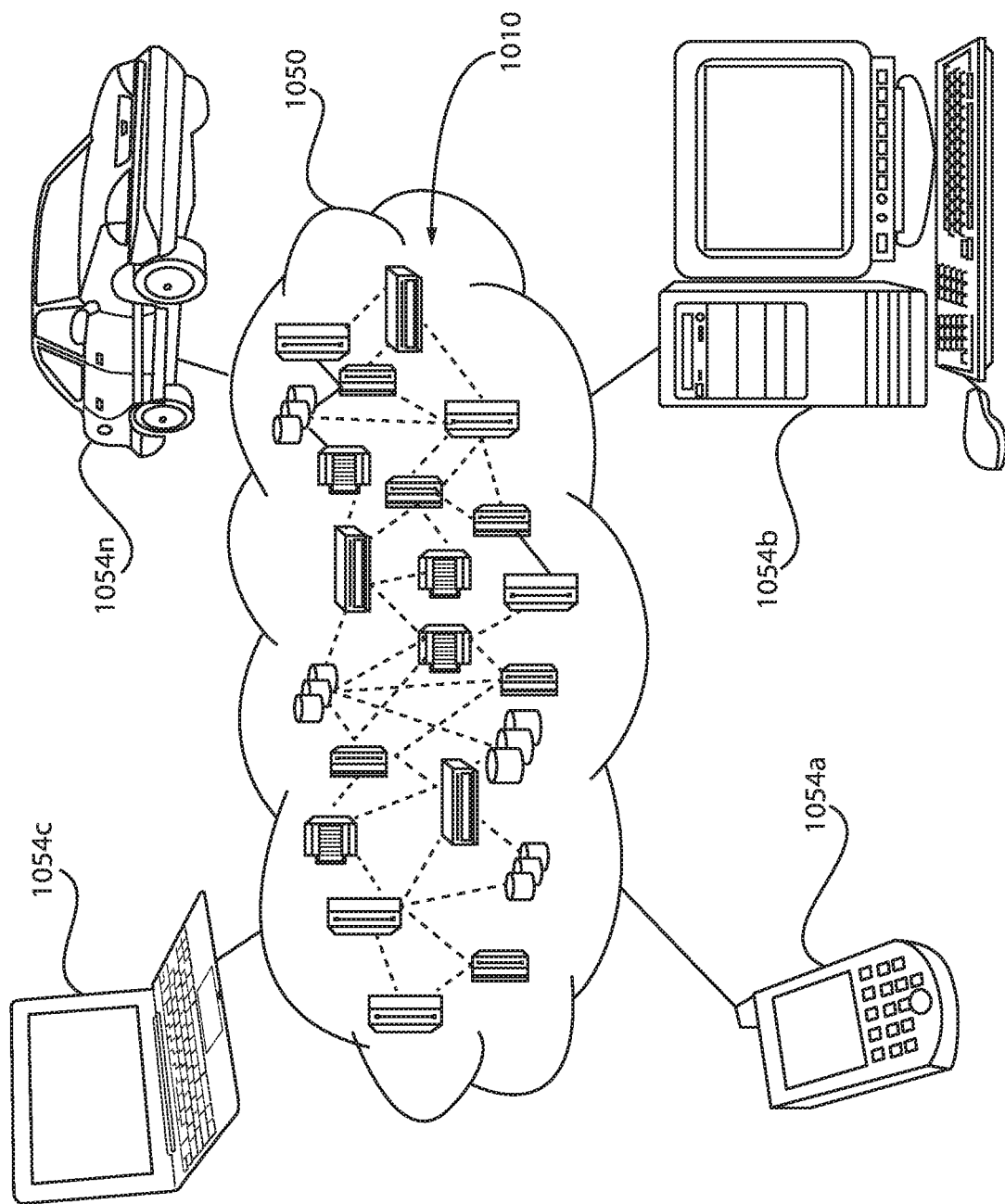
FIG. 10 is a block/flow diagram of an exemplary cloud computing environment, in accordance with an embodiment of the present invention.

FIG. 10 is a block/flow diagram of an exemplary cloud computing environment, in accordance with an embodiment of the present invention.

It is to be understood that although this invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 10, illustrative cloud computing environment 1050 is depicted for enabling use cases of the present invention. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N can communicate. Nodes 1010 can communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that computing nodes 1010 and cloud computing environment 1050 can communicate with any type of computerized device over any type of network and/or network addressable connection (e.g., using a web browser).

Figure 11:
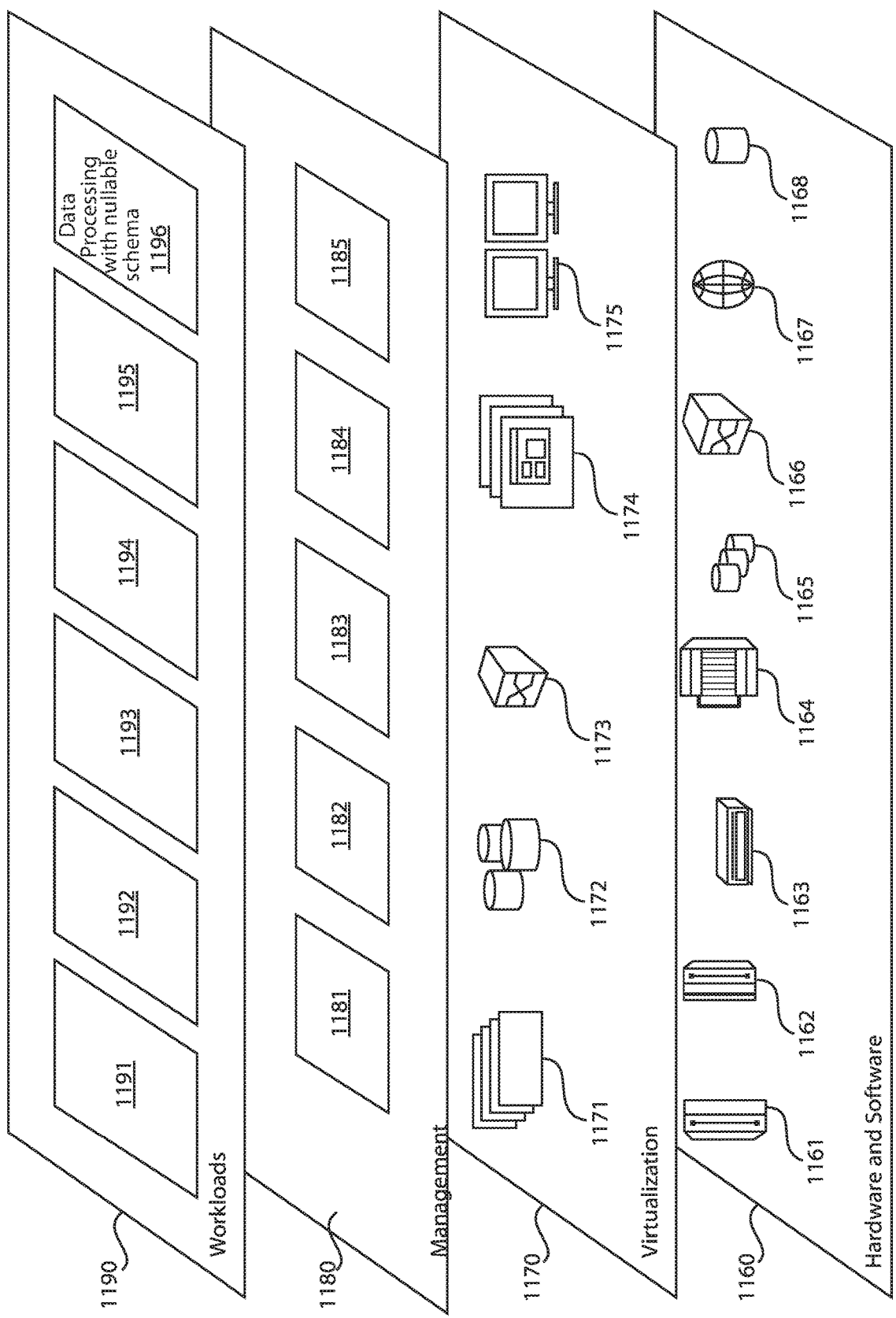
FIG. 11 is a schematic diagram of exemplary abstraction model layers, in accordance with an embodiment of the present invention.

FIG. 11 is a schematic diagram of exemplary abstraction model layers, in accordance with an embodiment of the present invention. It should be understood in advance that the components, layers, and functions shown in FIG. 11 are intended to be illustrative only and embodiments of the invention are not limited thereto. As depicted, the following layers and corresponding functions are provided:

Hardware and software layer 1160 includes hardware and software components. Examples of hardware components include: mainframes 1161; RISC (Reduced Instruction Set Computer) architecture based servers 1162; servers 1163; blade servers 1164; storage devices 1165; and networks and networking components 1166. In some embodiments, software components include network application server software 1167 and database software 1168.

Virtualization layer 1170 provides an abstraction layer from which the following examples of virtual entities can be provided: virtual servers 1171; virtual storage 1172; virtual networks 1173, including virtual private networks; virtual applications and operating systems 1174; and virtual clients 1175.

In one example, management layer 1180 can provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1183 provides access to the cloud computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment may be utilized. Examples of workloads and functions which may be provided from this layer include: mapping and navigation 1191; software development and lifecycle management 1192; virtual classroom education delivery 1193; data analytics processing 1194; transaction processing 1195; and data processing nullable schema operations 1196.

Still yet, any of the components of the present invention could be created, integrated, hosted, maintained, deployed, managed, serviced, etc. by a service supplier who offers to provide a method for performing Spark operations. Thus, the present invention describes a process for deploying, creating, integrating, hosting, maintaining, and/or integrating computing infrastructure, including integrating computer-readable code into the SIMD-based nullable schema information network, wherein the code in combination with the SIMD-based Spark workloads including nullable schema is capable of performing a method for performing Spark operations. In another embodiment, the invention provides a business method that performs the process blocks/steps of the invention on a subscription, advertising, and/or fee basis. That is, a service supplier, such as a Solution Integrator, could offer to provide a method for performing nullable schema operations. In this case, the service supplier can create, maintain, support, etc. a computer infrastructure that performs the process blocks/steps of the invention for one or more customers. In return, the service supplier can receive payment from the customer(s) under a subscription and/or fee agreement and/or the service supplier can receive payment from the sale of advertising content to one or more third parties.

The descriptions of the various embodiments of the present invention have been presented for purposes of illustration, but are not intended to be exhaustive or limited to the embodiments described. Many modifications and variations will be apparent to those of ordinary skills in the art without departing from the scope and spirit of the described embodiments. The terminology used herein was chosen to best explain the one or more embodiments, the practical application or technical improvement over technologies found in the marketplace, or to enable others of ordinary skills in the art to understand the embodiments described herein.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to at least one processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks or modules.

The computer readable program instructions can also be loaded onto a computer, other programmable data processing apparatus, or other device to cause a series of operational blocks/steps to be performed on the computer, other programmable apparatus or other device to produce a computer implemented process, such that the instructions which execute on the computer, other programmable apparatus, or other device implement the functions/acts specified in the flowchart and/or block diagram block or blocks or modules.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method for employing data processing with nullable schema information (which are intended to be illustrative and not limiting), it is noted that modifications and variations can be made by persons skilled in the art in light of the above teachings. It is therefore to be understood that changes may be made in the particular embodiments described which are within the scope of the invention as outlined by the appended claims. Having thus described aspects of the invention, with the details and particularity required by the patent laws, What is claimed and desired protected by Letters Patent is set forth in the appended claims.

The invention claimed is:

1. A computer-implemented method executed on a processor for improving performance of data processing with nullable schema information by using a data processing framework, the method comprising:
reading, by the processor, data from one or more blocks forming a column, where the data is stored in a database including the one or more blocks;
determining, by the processor, whether any row in each block of the one or more blocks includes null data;
generating and executing, by the data processing framework, optimized code for each block of the one or more blocks that is detected to be free of null data; and
generating and executing, by the data processing framework, non-optimized code for each block of the one or more blocks that is detected to include null data such that an original format of the one or more blocks detected to include the null data is maintained;
creating metadata for each block of the one or more blocks when an in-memory structure is created; and
employing the determining step when a schema is updated.

2. The method of claim 1, wherein the data processing framework is a cluster computing engine.

3. The method of claim 1, further comprising creating metadata for each block of the one or more blocks when a file is created.

4. The method of claim 1, further comprising, when executing a subquery, employing the determining step to an output of the subquery.

5. The method of claim 1, further comprising employing the determining step when an index is created.

6. The method of claim 1, further comprising employing the determining step when a query is executed, the query scanning a part of a column or a whole column.

7. The method of claim 1, further comprising forming the column in a data frame including a plurality of rows and a plurality of columns.

8. The method of claim 1, further comprising storing and reusing results of the determining step.

9. A computer system for improving performance of data processing with nullable schema information by using a data processing framework, the computer system comprising:

a memory; and at least one processor in communication with the memory, wherein the computer system is configured to:

read, by the processor, data from one or more blocks forming a column, where the data is stored in a database including the one or more blocks;

determine, by the processor, whether any row in each block of the one or more blocks includes null data;

generate and execute, by the data processing framework, optimized code for each block of the one or more blocks that is detected to be free of null data; and generate and execute, by the data processing framework, non-optimized code for each block of the one or more blocks that is detected to include null data such that an original format of the one or more blocks detected to include the null data is maintained, wherein metadata is created for each block of the one or more blocks when an in-memory structure is created; and wherein the determining is employed when a schema is updated.

10. The computer system of claim 9, wherein the data processing framework is a cluster computing engine.

11. The computer system of claim 9, wherein further metadata is created for each block of the one or more blocks when a file is created.

12. The computer system of claim 9, wherein, when executing a subquery, the determining is employed to an output of the subquery.

13. The computer system of claim 9, wherein the determining is employed when an index is created.

14. The computer system of claim 9, wherein the determining is employed when a query is executed, the query scanning a part of a column or a whole column.

15. A non-transitory computer readable storage medium comprising a computer readable program for improving performance of data processing with nullable schema information by using a data processing framework, wherein the computer readable program when executed on a computer causes the computer to perform the steps of:

reading, by the processor, data from one or more blocks forming a column, where the data is stored in a database including the one or more blocks;

determining, by the processor, whether any row in each block of the one or more blocks includes null data;

generating and executing, by the data processing framework, optimized code for each block of the one or more blocks that is detected to be free of null data;

generating and executing, by the data processing framework, non-optimized code for each block of the one or more blocks that is detected to include null data such that an original format of the one or more blocks detected to include the null data is maintained;

creating metadata for each block of the one or more blocks when an in-memory structure is created; and employing the determining step when a schema is updated.

16. The computer readable storage medium of claim 15, wherein metadata is further created for each block of the one or more blocks when a file is created.

\* \* \* \* \*